Patented Nov. 19, 1940

2,222,350

UNITED STATES PATENT OFFICE 2,222,350

PROCESS FOR PRODUCING N-SUBSTITUTION PRODUCTS OF MELAMINE

Karl Keller and Ernst Korten, Frankfort-on-the-Main-Fechenheim, Germany, assignors to I. G. Farbenindustrie Aktiengesellschaft, Frankfort-on-the-Main, Germany No Drawing. Application July 8, 1939, Serial No. 283,454. In Germany July 11, 1938

1 Claim. (Cl. 260—248)

Our present invention relates to a process for producing N-substitution products of melamine.

N-substitution products of melamine have been prepared hitherto only by starting from triazine compounds.

According to the present invention N-substitution products of melamine are produced by heating a mixture of dicyandiamide and a primary or secondary amine of the aliphatic, aliphatic-aromatic, hydroaromatic or aromatic series to elevated temperatures in a closed vessel with or without the addition of a solvent or diluent of non-acidic character. Thereby besides melamine mixtures of mono-, di- and poly-substitution products of melamine are obtained, the proportion of the individual components being dependent in a far-reaching manner upon the reaction conditions applied.

The formation of the N-substitution products of melamine occurs apparently with passage through different intermediate stages, probably for example substitution products of guanidine, biguanide or cyanamide are first formed. When using primary amines apparently besides the normal melamine derivatives as by-products substitution products of isomelamine are formed in small quantities.

The mixtures thus obtained may be used as such, for instance for the production of aldehyde condensation products, or they may be separated into the individual components according to the usual methods, for instance by dissolving them in suitable solvents, in some cases advantageously after conversion into the salts of the bases.

In order to further illustrate our invention the following examples are given, the parts being by weight and all temperatures in degrees centigrade.

Example 1

To 300 parts of powdered dicyandiamide 90 parts of liquid dimethylamine are added in a closed vessel. The mixture is slowly heated to about 120° whereby a strong exothermic reaction occurs and the reaction temperature rises to about 220°. Then the mass is slowly cooled and about 320 parts of a crude product is obtained consisting mainly of melamine, N-dimethylmelamine of the formula:

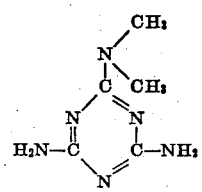

and N.N'-tetramethylmelamine of the formula:

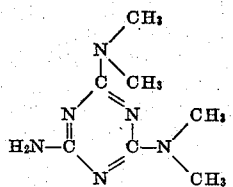

The separation into the components may be carried out for instance by extraction with ethyl or butyl alcohol whereby melamine remains undissolved. From the filtrate firstly N-dimethylamine crystallises out, then after a partial evaporation the N.N'-tetramethylmelamine. One may likewise dissolve the crude product in hot formic acid of about 10% strength, remove small quantities of insoluble products, consisting mainly of melamine, and cool the solution to room temperature, whereby the formate of melamine separates and is filtered off. The liquor is neutralized with ammonia, whereby N-dimethylmelamine separates, which after having been purified by means of water and alcohol melts at 307 to 308°. From the neutral mother liquor after standing or more rapidly after the further addition of ammonia the N.N'-tetramethylamine of melting point 220 to 222° separates.

By varying the reaction conditions, for instance by using an excess of dimethylamine, the yield of N-dimethyl- and N.N'-tetramethylmelamine can be increased and that of melamine diminished.

Example 2

A mixture of 126 parts of dicyandiamide and 292 parts of butylamine is heated for about 17 hours at 250 to 280° in an iron autoclave. When cool the reaction mass is repeatedly extracted with ether. In this manner about 80 parts of a crystalline residue and an etherial solution are obtained which may be worked up for instance as follows:

(a) The residue is extracted with alcohol, whereby about 32 parts of white crystals remain, consisting mainly of melamine and a little amount of melam. The alcoholic solution is evaporated and the residue is extracted with benzene. There remain about 32 parts of monobutylmelamine of the formula:

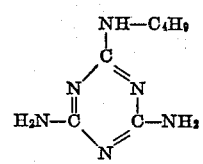

as a white crystalline powder melting at 180 to 185°. The benzene solution contains a further reaction product of a minor nitrogen content.

(b) The aforesaid etherial solution is evaporated and about 150 parts of a brownish sirup are obtained consisting mainly of two components which may be isolated as follows: The sirup is digested with 600 parts of hot normal hydrochloric acid, whereby a crystalline pulp is formed in admixture with an oily substance. When cool the pulp is dried and extracted with ether. There remain about 100 parts of pure monohydrochloride of N.N'-dibutylmelamine of the formula:

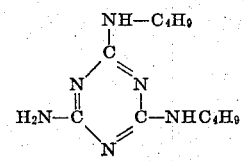

as a white crystalline powder of 245 to 247° melting point. It has a nitrogen content of 30.2% and a chlorine content of 12.9%. The free base may be obtained by digesting the hydrochloride with a sodium carbonate solution and extracting with ether. It is a light sirup which solidifies when cool with formation of crystals.

Example 3

200 parts of finely powdered dicyandiamide are mixed with 126 parts of monobutylamine and 50 parts of one of the commercial activated bleaching earths and the mixture is slowly heated in a closed vessel to about 200°. The temperature is maintained for about 15 hours, the pressure ascending to about 45 atmospheres. When cool the formed crystalline mass is extracted with methanol. The residue, about 140 parts consists of the employed bleaching earth, melamine and a little quantity of melam. The methanolic solution is evaporated and the remaining crystalline mass is digested with ether, filtered off and washed with ether. In this manner 60–65 parts of monobutyl melamine of about 185° melting point are obtained, cf. the foregoing example. The aforesaid etherial filtrate is evaporated and held at slightly reduced pressure for some time at 80 to 100° in order to remove gaseous ingredients. In this manner about 70 parts of a viscous sirup are obtained consisting according to an analysis probably mainly of a tributylmelamine.

Example 4

A mixture of 252 parts of strongly dried and finely powdered dicyandiamide, 146 parts of isobutylamine and 150 parts of xylene is heated in a closed vessel while stirring at 130 to 135°. The pressure increases to about 38 atmospheres. When cool the reaction mixture may be worked up in a similar manner as described in the Example 2. Thus are obtained about 116 parts of melamine, about 7 parts of melam, about 45 parts of monoisobutylmelamine of 160 to 166° melting point, the hydrochloride of which melts at 260 to 266°, about 95 parts of N.N'-diisobutylmelamine as a sirup, which solidifies when cool in a crystalline form, the monohydrochloride of which melts at about 230 to 235°. Finally 20 to 25 parts of a mixture of symmetrical triisobutylmelamine with byproducts of a minor nitrogen content are obtained.

Example 5

A mixture of 126 parts of dicyandiamide and 290 parts of aniline is heated in an autoclave for 10 to 12 hours while stirring at 140 to 145°, whereby the pressure rises to 20 atmospheres. When cool the excess of aniline is removed from the formed crystal pulp by steam distillation. The residue is evaporated and extracted with boiling alcohol, whereby about 53 parts of melamine remain.

From the alcoholic solution by fractionated crystallisation monophenylmelamine, diphenylmelamine, triphenylmelamine and a crystalline substance, soluble in ether, melting at 80 to 85° of a nitrogen content of about 29.5% can be isolated.

We claim:

Process for producing N-substitution products of melamine which consists in heating a mixture of dicyandiamide and in the free state an amine selected from the class consisting of those of the aliphatic and aromatic series containing a replaceable hydrogen atom to elevated temperatures in a closed vessel and isolating from the mixture thus obtained the individual components.

KARL KELLER.
ERNST KORTEN.